United States Patent [19]

Gallagher et al.

[11] 4,085,068

[45] Apr. 18, 1978

[54] HYDRODENITROGENATION AND HYDROCRACKING CATALYST

[75] Inventors: James P. Gallagher, Park Forest; John Mooi, Homewood, both of Ill.

[73] Assignee: Atlantic Richfield Company, Philadelphia, Pa.

[21] Appl. No.: 680,319

[22] Filed: Apr. 26, 1976

Related U.S. Application Data

[60] Continuation of Ser. No. 306,150, Nov. 13, 1972, abandoned, which is a division of Ser. No. 218,486, Jan. 17, 1972, Pat. No. 3,726,790, which is a continuation-in-part of Ser. No. 38,576, May 18, 1970, abandoned.

[51] Int. Cl.$^2$ .................... B01J 29/06; B01J 29/00; B01J 29/10
[52] U.S. Cl. .................... 252/455 R; 252/458; 252/459
[58] Field of Search .................... 252/455 R, 458, 459

[56] References Cited

U.S. PATENT DOCUMENTS

| | | |
|---|---|---|
| 3,260,680 | 7/1966 | Sanford et al. .................... 252/455 R |
| 3,417,030 | 12/1968 | O'Hara et al. .................... 252/455 R |
| 3,471,399 | 10/1969 | O'Hara .................... 252/455 R |

*Primary Examiner*—Carl F. Dees
*Attorney, Agent, or Firm*—Frank J. Uxa

[57] ABSTRACT

A process for hydrocracking and denitrogenation of heavy oils to form improved products, e.g., middle distillates, and a catalyst for use in the process are disclosed. The catalyst comprises a composite support containing a total of about 30% to about 70% by weight of silica and about 70% to about 30% by weight of alumina, formed from a combination of silica-alumina and alumina derived from hydrous alumina selected from the group consisting of boehmite, and mixtures of boehmite and amorphous hydrous alumina. The catalyst contains catalytically-effective amounts of a Group VIb and/or Group VIII metal. In a typical example, a distillate heavy mineral oil having an end boiling point up to about 1100° F. and containing from about 500 ppm to 5000 ppm of nitrogen is contacted with hydrogen over the catalyst at a temperature of about 650° F. to 900° F., a pressure of about 500 psi to 5000 psi, a weight hourly space velocity of about 0.5 to 4 and a hydrogen flow rate of from about 3000 to 30,000 standard cubic feet of hydrogen per barrel of oil to produce improved products.

12 Claims, No Drawings

HYDRODENITROGENATION AND HYDROCRACKING CATALYST

This is a continuation of application Ser. No. 306,150, filed Nov. 13, 1972, now abandoned, which is a division of application Ser. No. 218,486, filed Jan. 17, 1972, now U.S. Pat. No. 3,726,790, which is a continuation-in-part of application Ser. No. 38,576, filed May 18, 1970, now abandoned.

This invention relates to a process of hydrocracking and denitrogenation of mineral oils to form improved products, e.g., distillate hydrocracking feedstock, catalytic cracker feedstock, middle distillates, and the like, and a catalyst used in the process. In particular, this invention relates to a hydrocracking and denitrogenation process which provides improved products from heavy mineral oils having an end point of up to about 1100° F. and, in many instances, containing from about 500 ppm to about 5000 ppm of nitrogen, by contacting the feedstock with hydrogen over a catalyst comprising a major amount of a catalytically active support derived by the calcination of a material comprising from about 30 to about 70% by weight of silica and from about 30 to about 70% by weight of alumina based on the total silica and alumina in the support, said silica and alumina being supplied by a mixture comprising from about 40 to about 90% by weight amorphous silica-alumina and from about 10 to about 60% by weight of a group consisting of boehmite and mixtures of boehmite and amorphous hydrous alumina, and a minor catalytically effective amount of at least one metal selected from the group consisting of Group VI$b$ metal, Group VIII metal and mixtures thereof, at a temperature in the range from about 650° F. to about 900° F. The process is especially suited to feedstocks boiling primarily within the range from about 600° F. to about 1100° F. In many instances, the process is carried out so that at least about 20% by weight of the feedstock is converted to hydrocarbon components boiling below about 600° F.

A particularly preferred catalyst support comprises a catalyst which is generally spherical in shape and which comprises usually as the major component a composite support of small particles of finely divided, amorphous, silica-alumina and alumina, made by acid hydrolysis of aluminum.

The catalyst useful in the present invention can be formed by various means well known in the art, e.g., extrusion, tabletting, spheridizing, and the like, into, for example, extrudates having a diameter of up to about ⅛ inch and about ¼ inch in length, tablets having a diameter of about ⅛ inch and spheres having a diameter of up to about ⅛ inch, often at least about 1/64 inch. These catalyst particles often have a packed apparent density of from about 0.3 gram/cc to about 1 gram/cc. The Group VI$b$ and/or Group VIII metal usually comprises the minor proportion of the catalyst composition and can be present as the free metal or in combined form such as the metal oxides and/or the metal sulfides.

The catalyst support contains a total of from about 30 to about 70% by weight of silica and from about 70 to about 30% by weight of alumina, preferably from about 35 to about 65% by weight of silica and from about 65 to about 35% by weight of alumina. The support is a composite formed of from about 40 to about 90%, preferably from about 40 to about 85%, by weight of amorphous silica-alumina and from about 10 to about 60%, preferably from about 15 to about 60% by weight of alumina derived from hydrous alumina selected from the group consisting of boehmite and mixtures of boehmite and amorphous hydrous alumina. The amorphous silica-alumina component of the catalyst may be available in the form of relatively finely divided particles, e.g., of a particle size of up to about 65 microns, and contain from about 40 to about 90% by weight of silica and from about 10 to about 60% by weight of alumina. Commerically available silica-alumina hydrocarbon cracking catalyst particles can be used in making the catalyst of this invention, and in one instance, can contain 87% weight percent silica and 13% weight percent alumina. Particle size analysis of two silica-aluminas are given below in Table 1.

TABLE I

| A | | B | |
| --- | --- | --- | --- |
| Average Particle diameter, microns | Weight Percent | Average Particle diameter, microns | Weight Percent |
| 1.4 – 2.0 | 3.0% | 1.4 – 2.0 | 3.0% |
| 2.0 – 5.0 | 6.0% | 2.0 – 5.0 | 8.0% |
| 5.0 – 10.0 | 10.0% | 5.0 – 10.0 | 13.0% |
| 10 – 20 | 22.0% | 10 – 20 | 17.0% |
| 20 – 50 | 44.0% | 20 – 50 | 40.0% |
| 50 – 62 | 15.0% | 50 – 62 | 19.0% |
|  | 100.0% |  | 100.0% |

While these commercially available powders are relatively finely divided, the average particle diameter may be too large for most effective utilization in forming the catalyst support, for example, the spherical supports for the catalyst of the present invention.

Reduction of the size of these particles can be accomplished by milling. The milling can be, for example, wet-ball milling, dry impact milling, colloidal milling, etc. Table II below shows typical particle size data obtained from wet-milling and dry impact milling particles of a powder such as in Table I.

TABLE II

| Wet Milled | | Impact-Milled | |
| --- | --- | --- | --- |
| Average Particle diameter, microns | Weight Percent | Average Particle diameter, microns | Weight Percent |
| 1.5 – 5 | 57.5% | 0 – 10 | 19% |
| 5 – 10 | 29.0% | 10 – 20 | 22% |
| 10 – 20 | 9.55% | 20 – 30 | 32% |
| 20 – 30 | 1.5% | 30 – 44 | 18% |
| 30 – 45 | 2.5% | 44 – 50 | 9% |
|  | 100.0% |  | 100% |

As can be noted from Table II, 96 weight percent of the wet-milled particles are less than 20 microns average particle diameter and 91 weight percent of the dry impact-milled particles are less than 44 microns. For more efficient utilization, in the present invention at least about 80 weight percent, preferably at least about 90 weight percent, of the silica-alumina particles should have an average particle diameter of 44 microns or less, and should be composed to the major extent of particles of below 30 microns in diameter in order that the catalyst particles are devoid of or reduced in surface cracks and resulting weakness.

The silica-alumina component of the catalyst of the present invention may also be prepared by conventional methods similar to those methods known to the art for the production of synthetic silica-alumina cracking catalyst. Such preparations may involve forming a silica hydrogel by the precipitation of an alkali metal silicate solution with an acid such as sulfuric acid. Alumina is then precipitated by adding an alum solution to the silica hydrogel slurry and raising the pH into the alkaline range by the addition of sodium aluminate solution or by the addition of a base such as ammonium hydroxide. These conventional methods for producing silica-alumina also include co-precipitation techniques wherein the acid-acting alum solution is added to the silicate solution to precipitate both silica and alumina simultaneously perhaps with a pH adjustment for further precipitation. Also, a constant pH technique whereby the solutions of each oxide component are added continuously to a mixing vessel may be employed. In any event, the alumina is precipitated in the presence of silica to form what may be referred to as coherent aggregates of silica-alumina. Although the silica-alumina component of the present catalyst supports may have a wide range of surface areas, for example, from about 50 m$^2$/gm, to about 500 m$^2$/gm or more, it is preferred that the silica-alumina have a surface area of at least about 300 m$^2$/gm. The surface areas referred to herein are as determined by the BET nitrogen adsorption procedure (JACS, Vol., 60, pp. 309 et seq., 1938).

The added alumina content of the catalyst support of the present invention is obtained by combining alumina as hydrous alumina with the silica-alumina which may be, at the time of hydrous alumina addition, in any stage of manufacture, from the original crude hydrogel as precipitated and separated from the aqueous supernatent liquid to the completely finished silica-alumina product in either dried or calcined form.

The catalyst supports may be prepared by precipitation of hydrous alumina in the presence of the silica-alumina at a pH of about 5 to about 9, or the alumina hydrogel may be prepared separately. In either case, the preparation is such as to produce a support having added alumina in the form derived from hydrous alumina selected from the group consisting of boehmite and mixtures of boehmite and amorphous hydrous alumina. Preferably the boehmite alumina has a crystallite size of up to about 50A as determined by X-ray diffraction on samples dried to 110° C. The boehmite crystallite size L, in angstrom units (A), is an estimate obtained from the width of one of the diffraction peaks, using the Scherrer equation in the form $$L = \frac{0.9\lambda}{B \cos \frac{1}{2\theta}}$$

Here B is the width of the line at half maximum measured in radians, λ is the wave length of the X-rays used in angstrom units (1.54), and θ is the spectrometer angle at which the peak occurs (38°). When mixtures of boehmite and amorphous hydrous alumina are used, the boehmite often comprises from about 45 to about 85% by weight of the mixture and the amorphous hydrous alumina comprises from about 15 to about 55% by weight of the mixture.

The hydrous alumina precursor of the added alumina of the present catalyst supports can be prepared by various methods. Separate preparation of the hydrous alumina may be, for example, by precipitation of alumina at alkaline pH by mixing alum with sodium aluminate in aqueous solution or with a base such as soda ash, ammonia, etc. The solution from which the hydrous alumina is precipitated may contain a concentration of from about 5 to about 20% by weight of the aluminum salt. Ammonia, or more preferably ammonia water, or other aqueous base, can be added to the solution until the desired amount of alumina hydrate gel is precipitated. Preferably, at the end of precipitation, the slurry is so thick that it just barely can be stirred. After formation of the alumina hydrogel is complete, it may be filtered or decanted prior to its combination with the silica-alumina. The alumina hydrogel filter cake may be water washed to remove part or most of its ion content, e.g., sulfate and sodium ion present in the gel, but preferably this step is omitted. Thereafter, the alumina hydrogel is ready for mixing with the silica-alumina material, for example, silica-alumina hydrogel, and the combined hydrogel slurry is stirred continuously until a uniform mixture is obtained, usually about 30 to about 60 minutes stirring time is sufficient. The aqueous hydrous alumina-silica-alumina slurry may then be washed and concentrated as by settling and the aqueous material filtered off after which the catalyst precursor is thoroughly washed to remove interfering ions, especially, sodium and sulfate ions. The final catalyst support preferably contains less than about 0.5% by weight sulfate.

The hydrous alumina precursor may be prepared in the presence of the silica-alumina component of the present catalyst supports. In this procedure, the hydrated gel is peferably formed by reacting an aqueous solution of an aluminum salt of a strong inorganic acid, usually aluminum sulfate, with a base preferably ammonia water, at a pH which may vary from about 5 to about 9, preferably substantially all of the alumina is precipitated at a pH of about 7 to about 7.5. Precipitation of alumina from an aqueous solution of an alkali aluminate by addition of an acid may also be employed. Also, the hydrous alumina may be precipitated by hydrolysis from alcohol solutions of aluminum alkoxides although the use of inorganic salts is preferred.

One particularly preferred method for preparing this precursor hydrous alumina is by the acid hydrolysis of finely divided aluminum. In this manner, the dispersion or slurry of hydrous alumina prepared by this method can contain amorphous alumina as well as boehmite.

In the acid hydrolysis process, aluminum, preferably in a state of extremely fine subdivision and high surface area, is contacted with water, preferably at a temperature near the boiling point of water, in the presence of a non-oxidizing acid. The reaction produces a fine particle hydrous alumina slurry in water, the hydrous alumina comprising either beohmite or both of the valuable boehmite and amorphous forms.

In this hydrolysis process step, the aluminum employed can be finer than most materials referred to as "powder" and the metal can have a surface area of about 75 thousand to about 1 million square millimeters per gram, preferably about 150,000 to about 600,000 mm$^2$/gm. The aluminum may often be in the general particle size range of about 2 to about 100 microns. Preferably at least about 50 percent of the particles are about 10 to about 40 microns. The aluminum is usually one where at least about 90 percent can pass a 325 mesh sieve (U.S. Standard Sieve Series).

An aluminum suitable for this hydrolysis may have a purity greater than about 99% by weight or even greater than 99.9% by weight and may be obtained by atomizing molten aluminum in air. Such purity is especially desirable where the alumina is to be used as a support for a noble metal such as platinum. The aluminum often will have a particle size primarily within the range from about 5 microns to about 50 microns, for instance as follows:

| Particle Size | Proportion of Particles |
| --- | --- |
| 3.5 to 10 microns | 5 – 7% |
| 10 to 20 microns | 15 – 26% |
| 20 to 30 microns | 16 – 29% |
| 30 to 40 microns | 26 – 31% |
| 40 to 44 microns | 3 – 25% |
| 44 to 70 microns | 4 – 13% |

If the aluminum contains more than about 15% of particles in the range of 44–70μ or an appreciable amount of particles above 70μ, the reaction may require a longer time to go to completion or may never go to completion, under the preferred conditions of acid concentration. Too fine a particle size may lead to temperature control problems in the conversion procedure.

In this process, an acid is supplied to the reaction between aluminum and water but the amount of acid can be insufficient to supply one acid ion for each two atoms of aluminum, that is to say, the ratio of aluminum atoms to acid anions can be greater than about 2:1 and may be up to about 30:1 or more. Preferably, the ratio of aluminum atoms to acid anions is about 5–15:1 or even as much as about 25:1. Usually the reaction will be conducted at a pH below about 4.1.

In order to avoid the presence of ions which would require extensive washing of the product to yield an acceptable catalyst material, the acid employed may be one which will vaporize or be oxidized during the drying or other processing step of the alumina manufacture or decompose to materials vaporizable under these conditions. Nitric or other oxidizing acids give a number of poor results, in part due to interaction with the hydrogen produced in the reaction. Therefore, water-soluble, organic carboxylic acids generally are preferred for the reaction, in particular, the soluble saturated lower fatty acids, say of 1–2 carbon atoms, e.g., formic acid, acetic acid, tri-chloroacetic acid, etc. The monobasic acids are advantageous and formic acid is the most preferred.

The concentration of acid in the reaction mixture at any point of the reaction may have an effect on the product distribution. The preferred alumina monohydrate-hydrous amorphous alumina mixtures can be produced when the formic acid is very dilute, that is, sufficient to keep the pH of the reaction in the range of about 3 to 4. Above this pH, the product may tend to gel before the reaction is complete, thus delaying completion. Also, the formic acid may tend to decompose excessively. It is often preferable, therefore, to use formic acid of a molarity of about 0.6–0.7 and also to add the formic acid incrementally during the course of the reaction so that the pH will stay within the desired range.

Water in the liquid phase is present in the reaction mixture in amounts sufficient to keep the mixture fluid. Generally, the ratio of water to aluminum will be at least about 9 moles of water per gram atom of aluminum, preferably about 20–30:1. Higher amounts of water, that is, greater than about 30 moles per gram atom of aluminum, say up to about 60–75 moles, do not seem to offer any advantages to off-set the need for a larger reactor volume and a need to filter the resulting alumina product to get practical slurry concentration. When aluminum is added incrementally to the reaction mixture, it is possible and sometimes feasible to use slightly less than 10 moles of water per gram atom of aluminum.

The total reaction mixture usually contains a ratio of about one mole acid to about 2–30 gram atoms of aluminum metal to at least about 18, e.g., about 18 to 2,250 moles, of water. Preferably about 100–750 moles of water and 5–15 gram atoms of aluminum are often used per mole of acid.

As mentioned, it may often be preferred to add the aluminum metal and/or the formic acid incrementally to the water during the course of the reaction. Such incremental additions of formic acid and aluminum metal should preferably be at such rates that the approximate 1:5–15:100–750 acid-aluminum-water ratio described above and the 3 to 4 pH are maintained essentially throughout the reaction. Such manipulations accelerate the rate of reaction and provide for improved concentration of $Al_2O_3$ in the product slurry. For ease of handling, the fine aluminum powder may often be transported to the reaction zone as a slurry in water.

Reaction conditions for producing the alumina generally include a temperature of at least about 60° C., although the reaction may be slow below the preferred range of about 90°–110° C. The reaction can readily take place at a higher temperature, e.g., up to about 500 pounds steam pressure, that is, about 250° C., but pressurized equipment is required at this temperature to keep the necessary liquid phase. At the preferred temperature or below, one atmosphere pressure is satisfactory and water may be refluxed during the reaction. Often the reaction produces a relatively highly concentrated alumina slurry which can be sent directly to an alumina coagulation procedure. Sometimes, however, it may be desirable to further concentrate the slurry and in such cases, additional acid may be used after the reaction to peptize the alumina particles. Subsequent evaporation can then be employed to obtain a pourable thick slurry containing up to about 60% or more hydrous alumina.

This process is advantageous in its speed and in the fact that the completeness of the reaction (usually essentially 100%) and its freedom from reliance on non-vaporizable reagents give a purer product for uses such as in catalysts where purity is often essential. This process can provide the alumina as a much more concentrated water slurry than other processes; the slurry may contain from about 3 to about 15% by weight of alumina, often from about 7 to about 12% by weight, but by the proper choice of reaction procedures, can give a slurry containing as high as about 11 to about 12% by weight or more of alumina. Under a preferred set of conditions, the alumina obtained from the slurry will consist essentially of hydrous alumina in the amorphous and boehmite forms and in the proportions of about 15 to about 55% by weight amorphous and about 45 to about 85% by weight of boehmite, which is advantageous in many catalyst situations. The boehmite is generally of the small crystalline type, say from about 15A to about 35A in size.

Once the aqueous hydrous alumina-silica-alumina slurry is obtained, particles of catalyst support may be formed, washed, dried and calcined using methods well known in the art. It may be necessary to adjust the free water concentration of the above-noted slurry depending on how the catalyst support particles are to be formed. Tabletting, for example, generally requires a dryer mix than does extruding, which usually calls for a free water content of about 20 to about 40% by weight. Therefore, the slurry may be partially dried. The temperature at which the drying is performed is not critical but it is generally preferred to operate at temperatures up to about 400° F. It may be — because of the type of equipment employed, or for whatever reason — that it is preferable to dry the slurry completely, or relatively so, and then add back sufficient water to obtain a formable, e.g., extrudable, coaguable (for spheridizing), etc., mix. In many instances, for example, when the final catalyst is to be in the form of extrudates, tablets, pills and the like, the slurry may be dried, for example, by spray-drying, to form microspherical particles which can be impregnated with the group VI*b* and/or Group VIII metal using methods well known in the art. This impregnated material may be formed, dried and calcined using conventional methods to produce the final catalysts of the present invention. Also, the catalytically-active metals may be added after the support is formed, washed, dried and calcined and when the catalyst is to be in the form of spheres produced by the oil drop method, this procedure is preferred.

The formed particles are calcined at temperatures sufficient to effect the release of water of hydration from the particles and to provide a catalytically active alumina. Generally suitable are temperatures from about 300° C. to about 700° C. preferably from about 500° C. to about 600° C. The calcination can be effected in an oxidizing, reducing or inert atmosphere, the more economical use of a dry air calcining atmosphere being preferred. It is usually advantageous to calcine in a flowing stream of the gaseous atmosphere. Pressure can be atmospheric, super-atmospheric or sub-atmospheric.

When the above-noted commercially available silica-alumina particles are to be used in combination with hydrous alumina derived from acid hydrolysis of aluminum to form generally spherical catalyst supports, it is preferred that the silica-alumina particles be added in more or less dry conditions, e.g., either dried-milled or dried, wet-milled, to the acid hydrolysis product to prevent further dilution of the slurry. The mixture of silica-alumina and alumina is fed to a spheridizing column to form the generally spherical support. The spheres can be, for example, up to about ⅛ inch in diameter, often about 1/64 inch in diameter.

The spheres may be prepared in the oil-drop method, or example, as disclosed in copending application Ser. No. 805,086, filed Feb. 4, 1969, in the names of Carl D. Keith and Kurt W. Cornely, now U.S. Pat. No. 3,558,508. In the oil-drop method, drops of a coagulable aqueous slurry of the mixture of silica-alumina and hydrous alumina are fed with a column of a water-immiscible liquid, e.g., mineral oil, which can be maintained at close to ambient temperature, e.g., up to about 120° F. The column can also contain a coagulating agent which is preferably gaseous ammonia passing upwardly through the column. As the drops descend in the column essentially firm spheroidal particles are formed. The resulting particles can be collected in the lower portion of the column separated from the water-immiscible or other liquid and, if desired, aged in ammonia water, washed, dried and calcined. If the solid precursor is calcined, the resulting product is a hard, porous spheroidal alumina gel. Calcination is at a temperature which gives a catalytically-active alumina, say from about 400° C. to about 700° C.

The gelation of the spheroidal particles can be brought about in part by the presence of a coagulating agent in the water-immiscible liquid. Although ammonia is preferred, other coagulating agents can be used. Among the useful materials are the weak bases which are water-soluble and have a strong buffering action at a pH from about 4 to about 10, preferably about 5 to about 9, e.g., hexamethylene tetramine. Various nitrogen-containing bases can be used, e.g., urea, tetramethyl ammonium hyroxide, etc., some of which may release ammonia in the water-immiscible liquid. The coagulating agent can be mixed with the alumina before the latter is formed into drops providing the alumina is not unduly gelled which may particularly be a problem if too much gelling agent is added or if the mixed material is allowed to sit for too long a time before being released from the drop-forming mechanism.

It is preferred, however, that the coagulating agent be mixed with the water-immiscible liquid into which the drops are passed. This is most conveniently done by passing the agent into the liquid column, e.g., into its bottom portion, the ammonia is particularly suited for this type of operation. Ammonia is further preferred since it is relatively inexpensive and provides spheres of good quality and it is thus strongly preferred that the water-immiscible column be essentially free of other nitrogen-containing materials, and there be a slight excess of ammonia as evidenced by the bubbling of ammonia from the top of the column. Although excess ammonia can be withdrawn from the system, the rate of ammonia or other coagulating agent introduced into the water-immiscible liquid column should be sufficient to produce firm particles but should not be so high that the ammonia concentration at the air-immiscible liquid interface give instantaneous gelation of the drops of slurry issuing from the orifices, which may result in plugging of the orifices as well as give misshapen particles with undesirable physical characteristics. Also, as the immiscible liquid becomes saturated with water from the feed slurry, the immiscible liquid also becomes saturated with ammonia, due to the high solubility of ammonia in water. The effect of this over-saturation can be that the drops of slurry which can be lens-shaped at the moment of contact with the immiscible liquid surface remain so due to the high ammonia concentration. To avoid this difficulty, water can be separated from the immiscible liquid by centrifuging or drying by contact with an absorbent.

It has been noticed that at high discharge rates from the feed orifices in the oil-drop column, the hydrous alumina slurry drops may have a tendency to cluster at the top of the column prior to their fall as spheroidal particles through the oil column. This problem, if observed, can be overcome by the incorporation of a small amount of soluble starch into the slurry, for instance up to about 10% by preferably from about 1 to about 3% based on the weight of alumina. Violent agitation in the slurry reservoir may give rise to an excessive amount of air entrainment in the slurry due to the frothing of the starch/slurry mixtures and, therefore, should be avoided.

The water-immiscible coagulation medium used in the process of the instant invention can be, for example, any of the mineral oils which produce a firm spheroidal gel for a given length of oil column. Examples of suitable mineral oils include kerosene, heavy naphtha, light gas oil, lubricating oil, coal tar oils such as xylol, etc. A desirable water-immiscible medium is a lubricating oil with a viscosity of about 55 SUS to about 75 SUS at 100° F. However, if the spheroidal gel contains aluminum oxychloride, the use of only mineral oil may cause the spheres to be too soft and consequently they will flatten when collected. The addition of a halogen-containing lower aliphatic solvent or diluent such as carbon tetrachloride, bromo-ethane, acetylene tetrabromide, etc., to the oil can eliminate this problem by increasing the ammonia solubility in the oil. Other suitable diluents for the water-immiscible liquid in the liquid column include liquids or solids which are denser than the water-immiscible liquid and fully miscible therewith in the proportions used. Such densifiers may, when used, often comprise about 10 to about 30% by volume of the column of liquid. The densified liquid retards settling of the spheroids in the column and may make possible successful use of a shorter column. An additive increasing ammonia solubility in the liquid as noted may be of special advantage.

A frequently used water-immiscible medium is white mineral oil having a specific gravity of at least about 0.850. The medium utilized is dependent upon the length of the oil column and the specific gravity of the hydrous alumina slurry which is in turn dependent upon the total alumina concentration in the slurry. If the specific gravity of the oil medium is too low, the spheroidal particles will fall through the column at a high rate which may cause incomplete gelation, thus making the handling and processing difficult. If the specific gravity is too high, this may retard completely the descent of the spheroids. The specific gravity of the feed slurry is often in the range of about 1.150–1.170. The length of the oil column can vary widely depending, for instance, on the speed of coagulation. The column will usually be from about 1 foot to about 30 feet in length, more often about 6 feet to about 20 feet.

One of the advantages of the above-explained method is the elimination of the necessity in the alumina feed of organic nitrogen-containing coagulating agents such as hexamethylene-tetramine, urea, morpholine, etc. It was found that when $NH_3$, $NH_3$-forming base, or a strong nitrogen-containing base is mixed with the spheroidal-forming slurry, gelation may tend to occur before the particles are dropped. Thus, in the preferred form of the process, ammonia is added to the bottom portion of the column thus avoiding immediate gelation problems of the alumina feed and the particles, therefore, gradually age as they descent in the column.

Another advantage of this process is the elimination of the necessity for heating the immiscible liquid to insure gelation of the alumina-containing slurry. The immiscible liquid column can be operated at substantially ambient temperatures, e.g., up to about 120° F., preferably up to 100° F. or 110° F., whereas in the prior art process, it is usually necessary to heat the oil column in order to obtain sufficient spheroid hardness, often followed by aging in both hot oil and hot ammonia. Heating the column, in addition to the obvious expense, may cause loss of coagulation agent, e.g., $NH_3$, and even of densifier material such as $CCl_4$, if such be present.

Table III below shows data on two supports prepared as above, one of which utilized the wet-milled, dried silica-alumina and the other the impact-milled silica-alumina. The acid hydrolysis hydrous alumina component and parameters of formation were otherwise essentially the same.

TABLE III

|  | Wet-Milled $SiO_2$-$Al_2O_3$ | Impact Milled $SiO_2$-$Al_2O_3$ |
|---|---|---|
| Surface Area (m²/g) | 327 | 436 |
| Total Porosity (cc/g) | 0.81 | 1.39 |
| Large Pore Volume (pores > 100A, cc/g) | 0.15 | 0.64 |

Table IV shows the pore volume distribution of the two samples of Table III.

TABLE IV

| Wet-Milled $SiO_2$-$Al_2O_3$ | |
|---|---|
| Pore Size | Cumulative Pore volume |
| >50 A (rad.) | 0.480 cc/g. |
| >100 A (rad.) | 0.665 cc/g. |
| >1,000 A (rad.) | 0.710 cc/g. |
| Total (rad.) | 0.810 cc/g. |
| Impact-Milled $SiO_2$-$Al_2O_3$ | |
| Pore Size | Cumulative Pore Volume |
| >10 A (rad.) | 0.02 cc/g. |
| >100 A (rad.) | 0.81 cc/g. |
| >1,000 A (rad.) | 1.13 cc/g. |
| >100,000 A (rad.) | 1.39 cc/g. |

The calcined catalyst support particles, e.g., spheres, may be impregnated with the catalytic metal, such as the Group VIb metals, e.g., chromium, molybdenum and tungsten, and/or the Group VIII iron-group and platinum-group metals, e.g., iron, cobalt, nickel, platinum, iridium, osmium, palladium, rhodium and ruthenium. The catalytic metals can be present in the final catalyst as the free metals or in combined form such as the oxides and sulfides. Especially preferred catalysts contain nickel or cobalt together with either tungsten oxide or sulfide or molybdenum oxide or sulfide. The Group VIb metals can often be present in amounts of from about 5 to about 40%, preferably from about 10 to about 30% by weight of the total catalyst, calculated as the weight of the Group VIb metal oxide. The Group VIII iron-group metal is usually present in an amount of from about 2 to about 15%, preferably from about 4 to about 10% by weight of the total catalyst, calculated as the weight of the free metal. The Group VIII platinum group metal can be, for example, from about 0.1 to about 2%, preferably from about 0.3 to about 1% by weight of the total catalyst calculated as the metal.

The impregnation can be carried out as is known in the art. The metal is preferably in solution as a compound which is a precursor of the form, e.g., free metal, metal oxide or metal sulfide, desired in the catalyst. For example, to prepare a catalyst containing nickel and molybdenum oxide ($MoO_3$), a solution of nickel nitrate and ammonium molybdate in ammonia and water can be used as the impregnating solution. The impregnated support can then be dried, as, for example, at a temperature of about 100° C. to about 130° C. for a time such as 15 to 20 hours, and then calcined in flowing air at a temperature of about 500° C. to about 600° C. for about 2 hours to about 4 hours. Alternatively, ammonium molybdate can be dissolved in a solution of aqueous ammonia, prepared by admixing 29% ammonia and water in a ratio of 1.76:1, nickel nitrate is then added in this solution and forms the nickel amine complex ($Ni(NH_3)_6$++). This solution can then be used as the impregnant with the impregnated support being dried and calcined as before. After impregnation, the catalyst can be recalcined at the temperatures previously noted. The impregnation of the support with the catalytic metal solutions can also be performed sequentially, that is, impregnation with a solution of ammonium molybdate in ammonia followed by drying and calcination of the particles and then impregnation of the molybdenum-oxide containing support with a solution of nickel nitrate followed by another drying and calcination. Alternatively, the support may be impregnated with the Group VIII metal first.

The impregnated support can be reduced in hydrogen, as by heating the support in a stream of hydrogen at a temperature of from about 400° F. to about 1000° F., preferably from about 500° F. to about 800° F. To convert the metal and/or metal oxides in the catalyst to the sulfides, the support containing the metals in oxide form as obtained from the calcination may be sulfided by passing hydrogen sulfide, either pure or diluted with another gas, such as, for instance, hydrogen, over the catalyst bed at temperatures usually below about 800° F., preferably from about 400° F. to about 600° F., for a time sufficient to convert a significant portion of the oxides of the metal components to their respective sulfides. Alternatively, the catalyst may be sulfided during processing by the sulfur in the feed. Also, the metals can be deposited in the sulfide form when slurried as the sulfide in the manufacture of the catalysts.

The catalyst as described above is particularly useful in the hydrocracking-denitrogenation of feedstocks such as heavy oils, including heavy oil distillates, having end boiling points up to about 1100° F., for example, boiling primarily in the range of from about 600° F. to 1100° F., and containing from about 500 ppm. to about 5000 ppm of nitrogen. The heavy oil feedstock can be contacted with hydrogen over the catalyst as described above at a temperature of from about 650° F. to about 900° F., preferably from about 700° F. to about 850° F. Other suitable reaction conditions include pressures from about 500 psi to about 5000 psi, preferably from about 1000 psi to about 3000 psi; weight hourly space velocities of from about 0.5 to about 4, preferably from 1 to about 3 and hydrogen flow rates of from about 3000 to about 30,000 standard cubic feet of hydrogen per barrel of oil, preferably from about 5000 to about 20,000 standard cubic feet of hydrogen per barrel of oil. Contact of the feedstock over this catalyst as set forth above yields at least one improved product having, for example, a nitrogen concentration less than that of the heavy oil feedstock. In many instances, the improved product has a nitrogen concentration of less than about 20%, preferably less than about 10 or even about 5%, the nitrogen concentration of the heavy oil feedstocks. At least about 20 weight percent, preferably at least about 30 or even about 40 weight percent, of the feedstock is converted to hydrocarbon components boiling below about 600° F. The process as set forth above can be used as a single step to produce a middle distillate product or as a first or subsequent step in conjunction with other process steps for the production of various products from the feedstock and middle distillates products.

The invention shall be further illustrated with reference to the following examples.

EXAMPLE I

A catalyst was prepared on a spherical alumina-silica-alumina bead support. Four pounds of virgin, amorphous silica-alumina particles of 87% $SiO_2$, 13% $Al_2O_3$ and having a particle size of:

| Averge Particle Diameter, microns | | Weight Percent |
|---|---|---|
| 1.4–2.0 | = | 3.0% |
| 2.0–5.0 | = | 8.0% |
| 5–10 | = | 13.0% |
| 10–20 | = | 17.0% |
| 20–50 | = | 40.0% |
| 50–62 | = | 19.9% | were mixed with 6 liters of deionized water, and wet-milled for 18 hours in a porcelain ball-mill. The milled $SiO_2$—$Al_2O_3$ had the following particle size distribution:

| Average Particle Diameter, microns | | Weight Percent |
|---|---|---|
| 1.4–2.0 | = | 10.35% |
| 2.0–5.0 | = | 36.15% |
| 5.0–10.0 | = | 36.50% |
| 10–18.0 | = | 17.0% |

The solids content of the slurry was 90.46%, after filtering and drying.

635 grams of this 90.46% solids slurry was mixed with 4,000 grams of a 10.7 weight percent alumina-containing slurry of boehmite-amorphous hydrous alumina mixture (acid-hydrolysis product), 48% amorphous-52% boehmite (18A average crystallite size), to produce a composition of $SiO_2$ — 49.8%, $Al_2O_3$ — 50.2%. The boehmite-amorphous hydrous alumina mixture was produced by the formic acid hydrolysis at 100° C. of atomized aluminum metal of about 99.99% purity, about 97% of which passed through a 325 mesh screen.

The mixed slurry was beaten at a low speed in a Waring type blender. The slurry was then fed to an oil column 10 feet in length and 4 inches in diameter via a cylindrical stainless steel head to which were attached 9 to 18-gauge hypodermic syringe needles. The slurry was supplied to this head by means of a peristaltic type pump so that there would be a constant discharge rate from the syringe needles. The immiscible medium employed was a mixture of 77% by volume of a 65/75 SUS viscosity mineral oil and 23% by volume of carbon tetrachloride. Gaseous ammonia was added to the oil/carbon tetrachloride mixture at the rate of 1–5 ml./min. by means of a porous sparger located in the bottom portion of the column to substantially saturate the mixture. At the upper portion of the column there was attached an exhaust system so that the droplets emanating from the syringe needles would not coagulate immediately upon striking the free, ammonia-containing space above the oil/carbon tetrachloride level. As the droplets contacted the oil/carbon tetrachloride surface they immediately began to gel, and assumed a spheroidal shape which was retained and became more firm as they descended through the immiscible medium in the column. The spheres were collected in a suitable container attached to the bottom of the oil column.

The spheres were aged in 6% $NH_3$ for 15–30 minutes, then washed free of $NH_3$ and dried at 120° C. for 16 hours. The dried spheres were then calcined at 500° C. for 2 hours, and finally at 600° C. for 1 hour in air.

The resulting material had the following physical properties:

Surface Area = 421 m$^2$/g
Porosity = 1.02 cc/g
LPV (> 100A) = 0.34 cc/g
Pore Size Distribution (cc/g):
 18–100 A (dia.) = 0.480
 100–200 A (dia.) = 0.200

200-300 A (dia.) = 0.085
300-500 A (dia.) = 0.095
500-1000A (dia.) = 0.100
> 1000A (dia.) = 0.060
Bulk Density (loose) = 0.37 g/cc (23.1#/ft3)
Bulk Density (packed = 0.40 g/cc (25.25#/ft3)

200 grams of these beads were placed in a crystallizing dish and placed over water in a desiccator overnight. 213 g. of beads were recovered. These were impregnated with a solution of 80 g. ammonium metatungstate in deionized water to make 220 ml. The beads were held in contact with the solution for about 2 hours, transferred to a tray, and placed in an oven. The oven-dried beads were further vacuum impregnated with 118 g. $Ni(NO_3)_2 \cdot 6H_2O$ in deionized water to make 200 ml. of solution. The catalyst was transferred to a tray after about 2 hours contact with the solution. The catalyst was dried in the oven and calcined in a muffle furnace programmed to reach 1050° F. in 4 hours and then maintain 1050° F. for 3 hours. Recovery was 272g. Analysis of the catalyst (450-19056) showed 1.27% volatile at 1000° C., 8.10% Ni, 17.9% $WO_3$.

EXAMPLE II

A nickel-molybdena catalyst was prepared on the same support prepared in Example I.

200 grams of beads were placed in a crystallizing dish and placed over water in desiccator overnight. 212 g. beads were recovered after exposure. These beads were vacuum impregnated with a solution of 90.5 g. molybdic acid and 100 ml. conc. $NH_4OH$ in enough deionized water to make 220 ml. The beads were held in contact with the solution for about 2 hours, transferred to a tray, and placed in an oven. The oven-dried beads were placed in a crystallizing dish over water in a desiccator for about 2 hours, and then were vacuum impregnated with a solution of 122 g. $Ni(NO_3)_2 \cdot 6H_2O$ in deionized water to make 200 ml. of solution. The catalyst was transferred to a tray after about 2 hours contact with the solution. The catalyst was dried in the oven and calcined in a muffle furnace programmed to reach 1050° F. in 4 hours and then maintain 1050° F. for 3 hours. Fines were removed from the catalyst using a 12 mesh screen. Recovery was 290 g. Analysis of the catalyst (450-19210) showed 0.5% volatile at 1200° F., 8.25% Ni, 24.8% $MoO_3$.

EXAMPLE III

A catalyst was prepared on a silica-alumina- and alumina-containing bead support prepared as in Example I except that the silica-alumina particles had been given a mild steam treatment at 75 psig., which is equivalent to about 300° F., for about 8 hours before being ball milled. The milled silica-alumina slurry (38.04 weight percent solids) was added to the slurry of boehmite-amorphous hydrous mixture in an amount sufficient to produce a composition of 45.28 weight % $SiO_2$, 54.72 weight % $Al_2O_3$. The procedure for preparing the catalyst was essentially the same as that of Example II. Analysis of the catalyst (450-19219) showed 0.10% volatile at 1200° F., 8.40% Ni and 24.0% $MoO_3$.

EXAMPLE IV

An alumina hydrogel was prepared as follows:

In a tank containing 5500 gallons of water at 85° F. are dissolved 300 lbs. of soda ash. When the soda ash has been dissolved, 180 gallons of a 39% concentration aqueous sodium aluminate solution was pumped into the tank in about a 15 minute period. The contents of the tank are at about 84° F. 600 gallons of aqueous aluminum sulfate of 7.8% concentration as $Al_2O_3$ are added to the add mixture over an 80 minute period with water of dilution in conjunction and in addition thereto diluting the reaction mass at a rate of 25 gallons per minute.

The pH of the resulting aqueous reaction mass is adjusted to 8.0 with about 75 gallons of 39% concentration aqueous sodium aluminate solution which while being added is also diluted continuously with water at a rate of 35 gallons per minute over a 7½ minute addition period. The contents of the tank are heated to about 100° F. and pumped to storage.

The precipitated hydrated alumina is thereafter filtered on a large gel filter. The filtered product is partially purified by a one cycle water wash on the filter on which it is collected. This filter is a string vacuum type drum filter with a built in water spray nozzle directed toward the filter drum. Material on the drum is contacted with water on the drum as the drum rotates past the nozzle. After washing, the wet alumina hydrogel is stripped from the drum. This hydrogel analyzes about 50% boehmite having a crystallite size of about 35A, and about 50% amorphous hydrous alumina as determined by X-ray diffraction on dried samples.

A silica-alumina hydrogel was prepared using the following technique:

To a batch tank is added 4,275 gallons of water preheated to 90° F. and 6,865 gallons of sodium silicate solution (28.8% by weight of $SiO_2$, 40-41.5 baume at 68° F. and $Na_2O$ to $SiO_2$ ratio of 1 to 3.2) is added. The batch is stirred for 5 minutes, the concentration of the sodium silicate as $SiO_2$ in the batch is 6.3 weight percent. With the batch at 90° F., 302 gallons of 34.5 weight percent sulfuric acid solution at 182° F. are added over a period of 45 minutes. The gel forms about 35 minutes after acid addition is begun. Then the pH is adjusted to between 8.0 to 8.5. The batch is agitated for 10 minutes. Then 715 gallons of alum (7.8% by weight as $Al_2O_3$) is added to the gel over a period of about 36 minutes. The batch is agitated for an additional 5 minutes whereupon 205 gallons of sodium aluminate solution (24.4% by weight as $Al_2O_3$) diluted in 1,080 gallons of water is added over a period of 17 minutes. After all the sodium aluminate is added, the pH is checked. It should be between about 5.0 and 5.2. The alumina content of the silica-alumina hydrogel was 30 to 31 percent by weight. A sample of this silica-alumina hydrogel was spray dried using conventional techniques and calcined at 1050° F. for 3 hours. The dried calcined particles of silica-alumina was found to have a surface area of about 450 m²/gm.

A catalyst support containing 54% by weight of $SiO_2$ and 46% by weight of $Al_2O_3$ with a separate phase comprising 20% by weight of the support of alumina derived from the above-noted alumina hydrogel, was prepared in the following manner. The desired proportions of the silica-alumina hydrogel product and alumina hydrogel filter cake prepared as noted above were mixed together for about 1 hour. The finished batch had a pH of 5.5 to 5.6 and a temperature of about 110° F. The aqueous gel mixture was then pumped to a dewatering filter and the filter cake from said dewatering filter and a portion of aqueous gel were blended to give a gel slurry of about 14 weight percent solid. A portion of this hydrogel mixture was slurried as a thick flowable paste with a Lightnin stirrer fitted with a cage-beater and a propeller for about 10 minutes to give a thorough dispersion. The product was stirred about 1 minute at 14,500 r.p.m. in a Waring blender and dried in a laboratory spray drier. The spray dried material, i.e., microspheres, was washed with water to an acceptable impurity level and dried at 230° F. The washed and dried material analyzed 0.08% $SO_4$ and less than 25 ppm $Na_2O$. This dried material was impregnated with nickel and molybdenum and extruded using conventional techniques. The extruded product was dried and calcined to form the final catalyst cylinders having diameters of about 1/16 inch and lengths from about ⅛ inch to about ½ inch. The analysis of the final catalyst (450-18332) showed 1.85% by weight volatile at 1200° F., 7% nickel and 23% of $MoO_3$.

EXAMPLE V

A catalyst support was prepared in a manner similar to that of Example IV. This support was impregnated with nickel and tungsten using conventional procedures and the resulting impregnated material was extruded, dried and calcined to produce final catalyst particles in the form of cylinders having diameters of about 1/16 inch and lengths from about ⅛ inch to about ½ inch. The analysis of the final catalyst (450-18331) showed 1.18% by weight volatile at 1000° C., 8% Ni and 18% $WO_3$.

EXAMPLE VI

The following procedure was used to evaluate these catalysts and two commercial catalysts (X and Y):

The catalyst was placed in the reaction vessel, presulfided with $H_2S$ at about 700° F. and 200 psig. The system was then pressured to 1500 psig. with $H_2$, temperature raised to 750° F., and hydrocarbon and hydrogen feed rates established at 1.0 WHSV and 12,000 SCF/B, respectively. The hydrocarbon feed was a visbroken petroleum gas oil of 2000 ppm. nitrogen content, 0.615% sulfur, 12.07% hydrogen, 22.8° API and an ASTM boiling range (5-95%) of 549°-938° F. Reaction temperature was increased until about 30% conversion to normally liquid products boiling below 600° F. was obtained (about 32° API product). Calling this temperature $T_1$, the following tests were made:

| TEST | WHSV | T° F |
|---|---|---|
| 1 | 1 | $T_1$ |
| 2 | 1 | $T_1+20$ |
| 3 | 2 | $T_1+20$ |
| 4 | 1 | $T_1$ |
| 5 | 1 | $T_1$ |

The total test sequence elapsed time on oil (including the time required to establish $T_1$) was about 250 hours. The liquid product was fractionated, and the hydrocracking activity measured by weight percent conversion to the 600° F.-products. The denitrogenation activity was determined by the nitrogen content of the 600° F.+ product fraction. The relative activity measurements are compared to a standard activity on a relative WHSV for constant conversion basis. The measure of activity maintenance α, was obtained by comparing the activity determined by Test 1 with those from Tests 4 and 5, and also taking into account the catalyst's performance during the entire test procedure. Essentially, α is the ratio of activity at the end of the sequence to initial activity ($RA_{EOT}/RA_{IN}$). $RA_C$ is the Relative Activity for Cracking; $RA_N$ is the Relative Activity for denitrogenation; $\alpha_c$ is the Ratio of Relative Activity Final/Relative Activity Initial for cracking; and $\alpha_N$ is the ratio of Relative Activity Final/Relative Activity Initial for denitrogenation.

Using this evaluation procedure, the following results were obtained.

| Catalyst | $RA_C$ | $\alpha_C$ | $RA_N$ | $\alpha_N$ |
|---|---|---|---|---|
| Commercial X | 1.88 | 0.71 | 1.80 | 0.72 |
| Commercial Y | 1.0 | 0.70 | 1.68 | 0.61 |
| Example III | 1.20 | 1.00 | 1.20 | 1.00 |
| Example II | 1.80 | 1.00 | 1.60 | 1.00 |
| Example I | 1.86 | 1.00 | 1.62 | 1.00 |
| Example IV | 2.2 | 1.00 | 2.4 | 1.00 |
| Example V | 1.2 | 1.00 | 1.0 | 1.00 |

Catalyst X is prepared on an extruded silica-alumina support. Analysis: 3.19% volatile at 1000° C., 11.5% Ni, 20.5% $WO_3$, 42.2% $SiO_2$, 29.0% $Al_2O_3$. Catalyst Y is prepared on an extruded alumina support. Analysis: 0.86% volatile at 1200° F., 2.30% Ni, 15.6% $MoO_3$. Neither catalyst X or catalyst Y include both the silica-alumina and alumina components which are present in the catalysts of the present invention. The value of $\alpha_C$ and $\alpha_N$ equal to 1.0 for the catalysts of this invention shows that they maintained their activity throughout the test without loss of activity being detected. The commercial catalysts, however, lost about 30 to 40% of their initial activity during the test period.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. A composition of matter comprising a major amount of a catalytically-active support derived by the calcination of a material comprising from about 30 to about 70% by weight of silica and from about 30 to about 70% by weight of alumina, based on the total silica and alumina in said support, said silica and alumina being supplied by a mixture consisting essentially of from 40 to about 90% by weight of amorphous silica-alumina and from about 10 to about 60% by weight of alumina derived from hydrous alumina selected from the group consisting of boehmite and mixtures of boehmite and amorphous hydrous alumina and minor catalytically effective amounts of both nickel and at least one metal selected from the group consisting of Group VIb metals and mixtures thereof.

2. The composition of claim 1 wherein said support is derived by the calcination of an oil coagulated spherical material, said amorphous silica-alumina is finely divided, and said hydrous alumina is made by the acid hydrolysis of aluminum.

3. The composition of claim 1 wherein said material comprises from about 35 to about 65% by weight of silica and from about 35 to about 65% by weight of alumina based on the total silica and alumina in said support, said silica and alumina being supplied by a mixture consisting essentially of from about 40 to about 85% by weight of amorphous silica-alumina and from about 15 to about 60% by weight of alumina derived from hydrous alumina selected from the group consisting of boehmite and mixtures of boehmite and amorphous hydrous alumina, said mixtures composed of from about 45 to about 85% by weight of boehmite and from about 15 to about 55% by weight of amorphous hydrous alumina, the boehmite having a crystallite size up to about 50A.

4. The composition of claim 2 wherein said support is derived by the calcination of an oil coagulated spherical material comprising from about 35 to about 65% by weight of silica and from about 35 to about 65% by weight of alumina based on the total silica and alumina in the support, said silica and alumina being supplied by a mixture consisting essentially of from about 40 to about 85% of finely divided, amorphous silica-alumina and from about 15 to about 60% by weight of alumina derived from hydrous alumina made by the acid hydrolysis of aluminum, said hydrous alumina being composed of from about 45 to about 85% by weight of boehmite and from about 15 to about 55% by weight of amorphous hydrous alumina, the boehmite having a crystallite size in the range of from about 15A to about 35A.

5. The composition of claim 3 wherein said amorphous silica-alumina has a surface area of at least about 300 m$^2$/gm. and said Group VIb metal is present in an amount from about 5 to about 40% by weight of the total composition calculated as the Group VIb metal oxide, and said nickel is present in an amount from about 2 to about 15% by weight of the total composition calculated as the metal.

6. The composition of claim 4 wherein said amorphous silica-alumina has a surface area of at least about 300 m$^2$/gm. and said Group VIb metal is present in an amount from about 5 to about 40% by weight of the total composition calculated as the Group VIb metal oxide and said nickel is present in an amount from about 2 to about 15% by weight of the total composition calculated as the metal.

7. The composition of claim 5 wherein the Group VIb metal is present in an amount from about 10 to about 30% by weight of the total composition calculated as the Group VIb metal oxide and said nickel is present in an amount of from about 4 to about 10% by weight of the total composition calculated as the metal.

8. The composition of claim 6 wherein the Group VIb metal is present in an amount from about 10 to about 30% by weight of the total composition calculated as the Group VIb metal oxide and said nickel is present in an amount of from about 4 to about 10% by weight of the total composition calculated as the metal.

9. The composition of claim 7 wherein the Group VIb metal is selected from the group consisting of molybdenum, tungsten and mixtures thereof.

10. The composition of claim 8 wherein the Group VIb metal is selected from the group consisting of molybdenum, tungsten and mixtures thereof.

11. The composition of claim 9 wherein the Group VIb metal is molybdenum present as molybdenum oxide.

12. The composition of claim 10 wherein the Group VIb metal is molybdenum present as molybdenum oxide.

* * * * *